(12) United States Patent
Nomura

(10) Patent No.: US 11,594,372 B2
(45) Date of Patent: Feb. 28, 2023

(54) MULTILAYER CERAMIC CAPACITOR

(71) Applicant: Murata Manufacturing Co., Ltd., Nagaokakyo (JP)

(72) Inventor: Yoshiyuki Nomura, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/241,129

(22) Filed: Apr. 27, 2021

(65) Prior Publication Data

US 2021/0343476 A1    Nov. 4, 2021

(30) Foreign Application Priority Data

Apr. 30, 2020    (JP) .............................. JP2020-080103

(51) Int. Cl.
*H01G 4/012* (2006.01)
*H01G 4/008* (2006.01)
*H01G 4/12* (2006.01)
*H01G 4/30* (2006.01)

(52) U.S. Cl.
CPC ............. *H01G 4/012* (2013.01); *H01G 4/008* (2013.01); *H01G 4/1218* (2013.01); *H01G 4/30* (2013.01)

(58) Field of Classification Search
CPC ...... H01G 4/008; H01G 4/012; H01G 4/1209; H01G 4/232; H01G 4/30; H01G 4/0085; H01G 4/1218; H01G 4/2325
See application file for complete search history.

(56) References Cited

U.S. PATENT DOCUMENTS

| | | | |
|---|---|---|---|
| 2006/0044098 A1* | 3/2006 | Kimura ................ | H01G 4/2325 336/122 |
| 2014/0043724 A1* | 2/2014 | Kang ..................... | H01G 4/30 156/89.12 |
| 2015/0090483 A1* | 4/2015 | Moon .................... | H01G 4/232 29/25.42 |
| 2015/0170786 A1* | 6/2015 | Hong ..................... | H01B 1/02 427/79 |
| 2015/0213953 A1* | 7/2015 | Jun ........................ | H01G 4/30 252/512 |
| 2017/0032895 A1* | 2/2017 | Ogata ................... | H01G 4/1227 |
| 2019/0295773 A1 | 9/2019 | Kim et al. | |

FOREIGN PATENT DOCUMENTS

| | | |
|---|---|---|
| JP | 11-162771 A | 6/1999 |
| JP | 2018-098475 A | 6/2018 |
| JP | 2019-125794 A | 7/2019 |

* cited by examiner

*Primary Examiner* — Michael P McFadden
(74) *Attorney, Agent, or Firm* — Keating & Bennett, LLP

(57) ABSTRACT

A multilayer ceramic capacitor includes a multilayer body including dielectric layers which are stacked and internal electrode layers which are stacked, and external electrodes, each connected to the internal electrode layers. The external electrodes each include a conductive resin layer and a plated layer on the conductive resin layer. The conductive resin layer includes a resin portion, conductive fillers dispersed in the resin portion, and metal particles dispersed unevenly in a distribution differing from that of the conductive fillers in the conductive resin layer. An abundance ratio of the metal particles to the resin portion is higher on a side of the plated layer of the conductive resin layer than on a side of the conductive resin layer close to the multilayer body.

18 Claims, 8 Drawing Sheets

MULTILAYER CERAMIC CAPACITOR

CROSS REFERENCE TO RELATED APPLICATIONS

This application claims the benefit of priority to Japanese Patent Application No. 2020-080103 filed on Apr. 30, 2020. The entire contents of this application are hereby incorporated herein by reference.

BACKGROUND OF THE INVENTION

1. Field of the Invention

The present invention relates to a multilayer ceramic capacitor.

2. Description of the Related Art

Conventionally, in order to absorb the stress generated by rapid thermal change or the like, a multilayer ceramic capacitor including external electrodes including a conductive resin layer is known. Japanese Unexamined Patent Application, Publication No. H11-162771 discloses external electrodes in which a conductive resin layer is provided on the surface of a fired electrode layer, and a plated layer is further provided on the surface. As the conductive resin layer, a material made by blending conductive fillers into a thermosetting resin is used. These conductive fillers ensure the conductivity of the conductive resin layer.

In the configuration disclosed in Japanese Unexamined Patent Application, Publication No. H11-162771, the conductivity in the conductive resin layer, and the conductivity between the conductive resin layer and the plated layer rely on the contact probability of the conductive fillers. Therefore, when the contact probability of the conductive fillers is low, equivalent series resistance (ESR) becomes high. In addition, when the conductive fillers existing in the vicinity of the interface between the conductive resin layer and the plated layer are covered with the thermosetting resin, plating hardly deposits on the covered portion. This portion also causes a decrease in the conductivity between the conductive resin layer and the plated layer.

SUMMARY OF THE INVENTION

Preferred embodiments of the present invention provide multilayer ceramic capacitors that are each capable of decreasing ESR.

A multilayer ceramic capacitor according to a preferred embodiment of the present invention includes a multilayer body including a plurality of dielectric layers which are stacked and a plurality of internal electrode layers which are stacked; and external electrodes, each connected to the internal electrode layers, in which the external electrodes each include a conductive resin layer and a plated layer on the conductive resin layer, the conductive resin layer includes a resin portion, conductive fillers dispersed in the resin portion, and metal particles which are dispersed unevenly in a distribution differing from that of the conductive fillers in the conductive resin layer, and an abundance ratio of the metal particles to the resin portion is higher on a side of the plated layer of the conductive resin layer than on a side of the conductive resin layer close to the multilayer body.

According to preferred embodiments of the present invention, it is possible to provide multilayer ceramic capacitors that are each capable of decreasing ESR.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the drawings.

Figure 1:
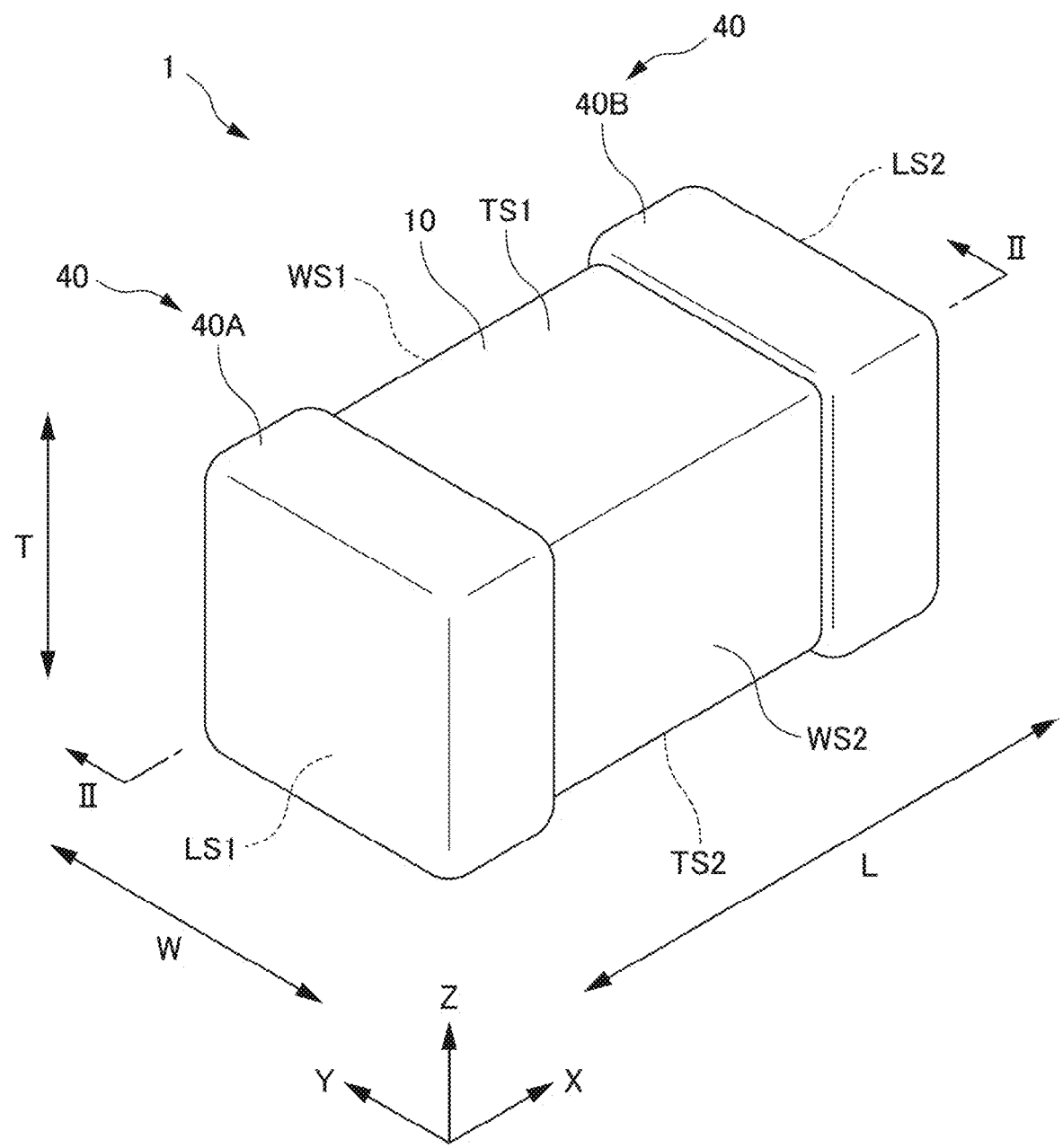
FIG. 1 is an external perspective view of a multilayer ceramic capacitor according to a preferred embodiment of the present invention.
Figure 2:
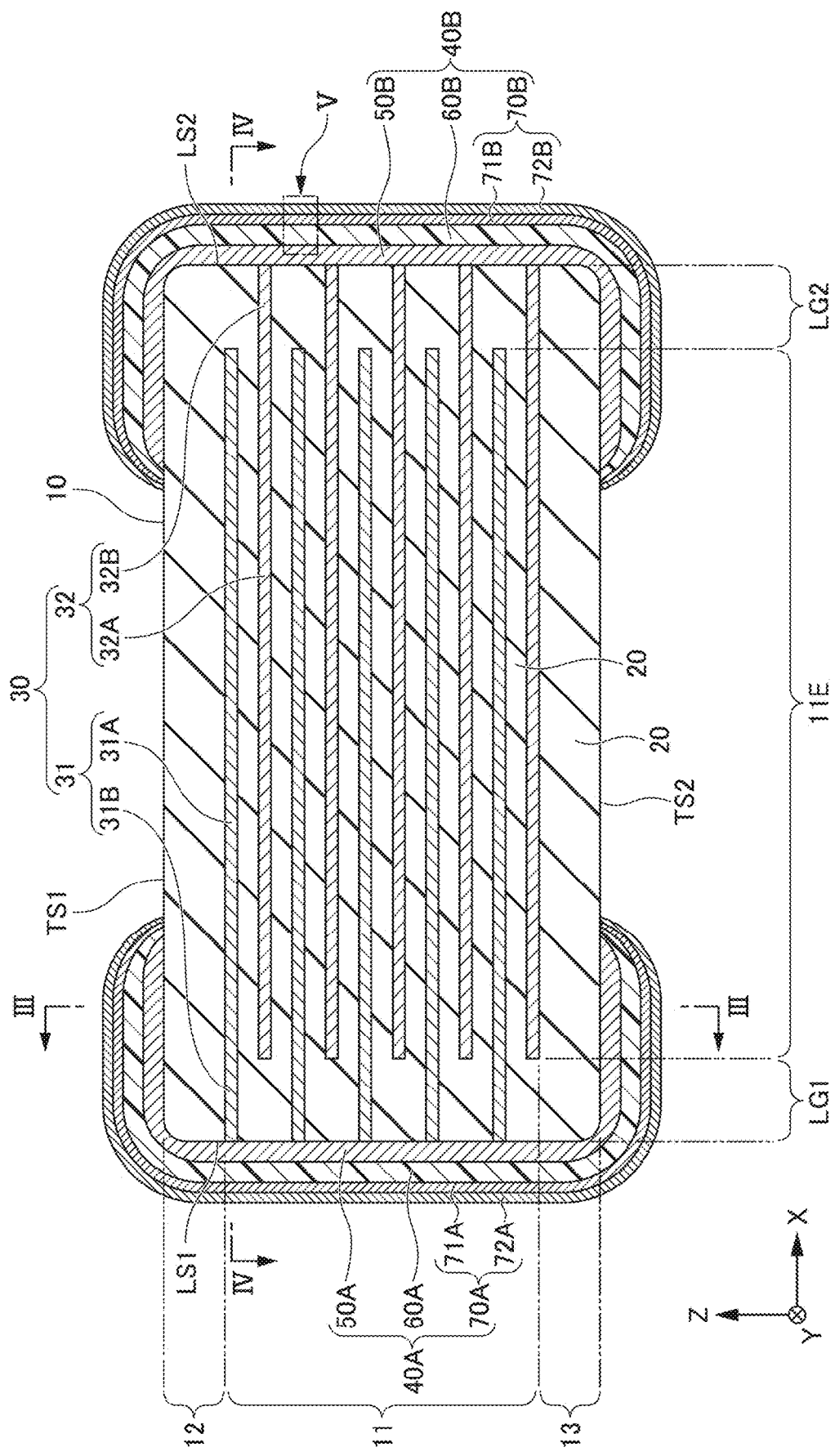
FIG. 2 is a cross-sectional view along the line II-II of the multilayer ceramic capacitor shown in FIG. 1.
Figure 3:
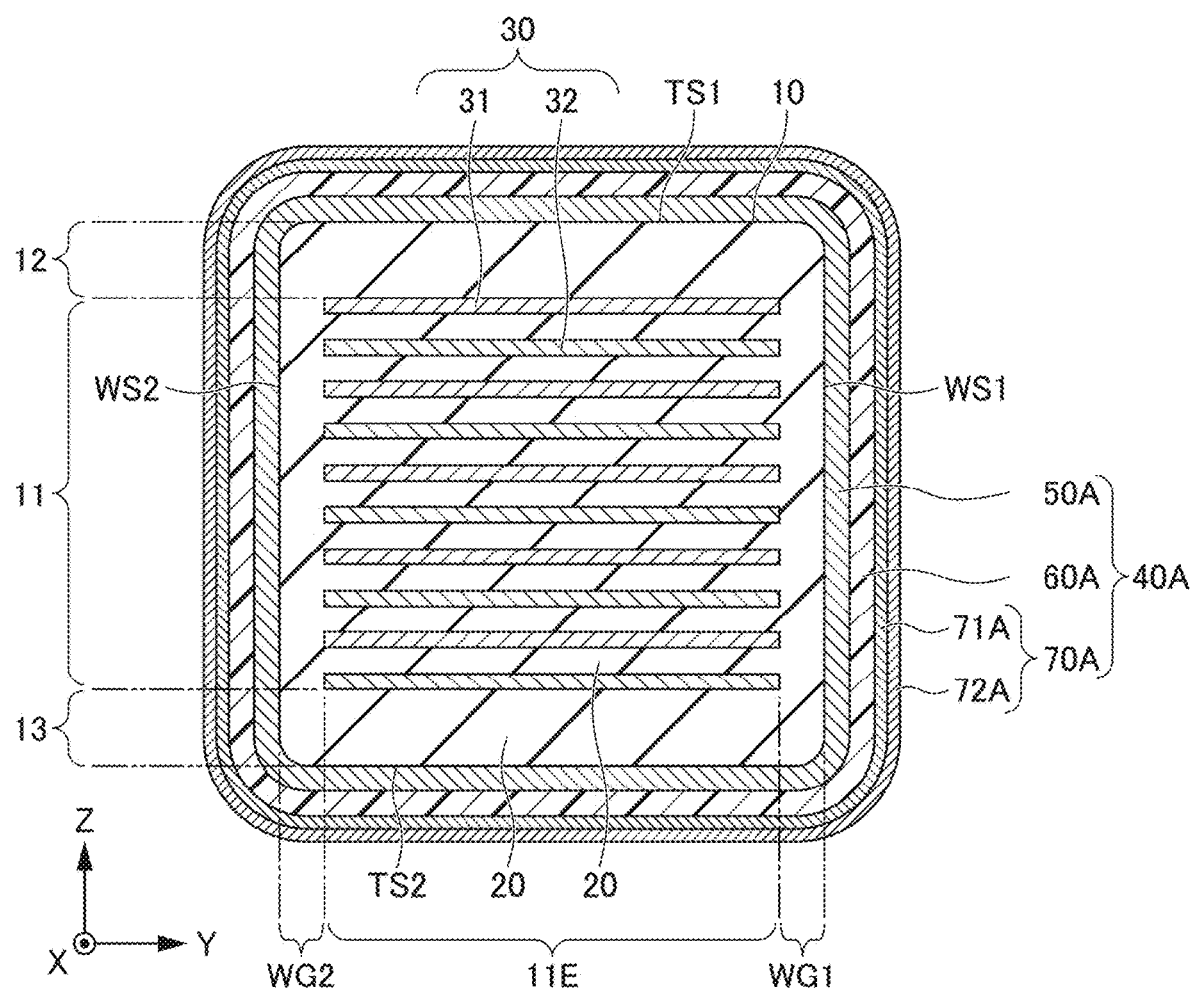
FIG. 3 is a cross-sectional view along the line III-III of the multilayer ceramic capacitor shown in FIG. 2.
Figure 4:
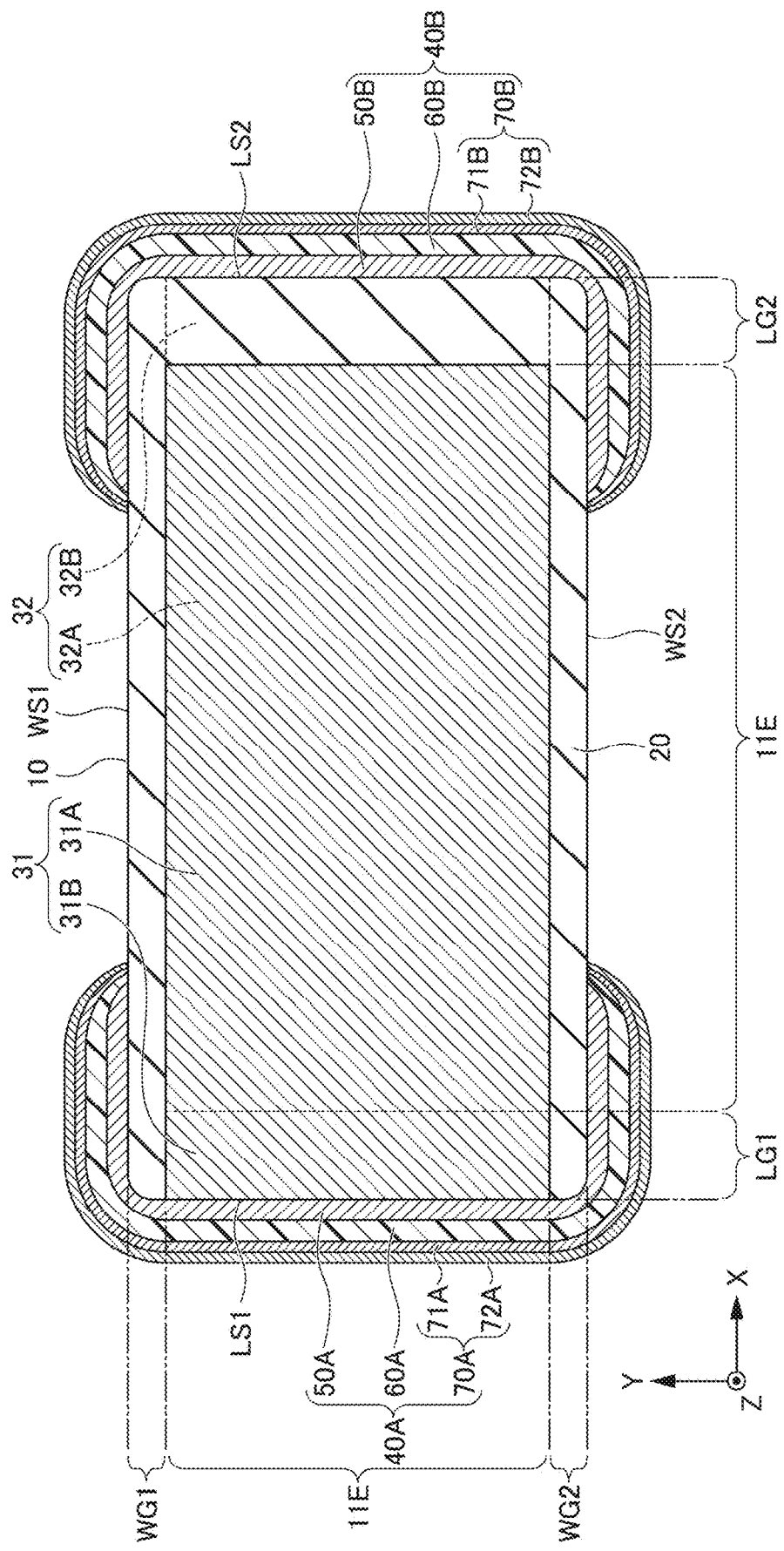
FIG. 4 is a cross-sectional view along the line IV-IV of the multilayer ceramic capacitor shown in FIG. 2.
Figure 5:
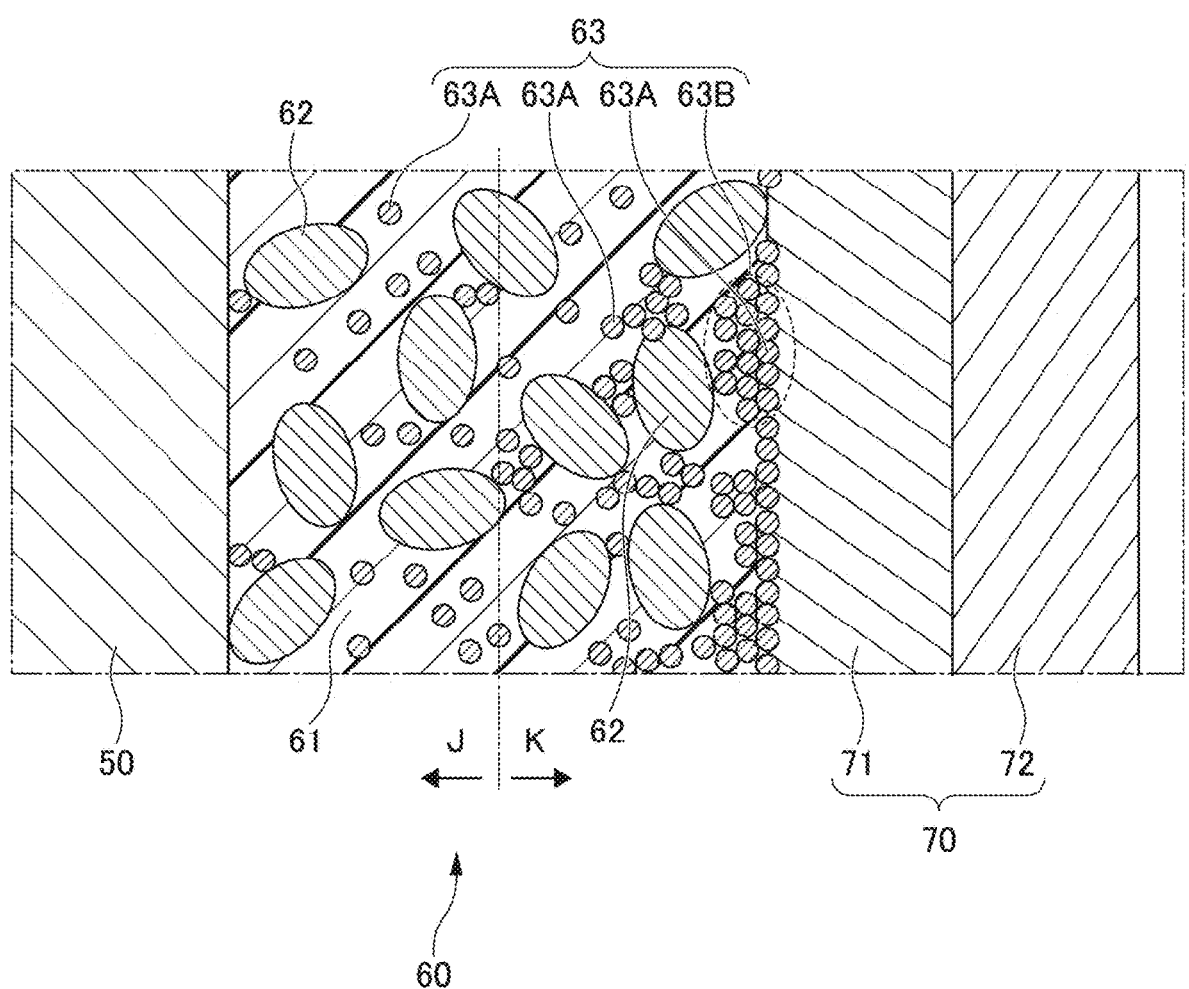
FIG. 5 is an enlarged view of a V portion of the multilayer ceramic capacitor shown in FIG. 2, and is a diagram showing an overview of a conductive resin layer.

Hereinafter, a multilayer ceramic capacitor 1 according to a preferred embodiment of the present invention will be described. FIG. 1 is an external perspective view of the multilayer ceramic capacitor 1 of the present preferred embodiment. FIG. 2 is a cross-sectional view taken along the line II-II of the multilayer ceramic capacitor 1 shown in FIG. 1. FIG. 3 is a cross-sectional view taken along the line III-III of the multilayer ceramic capacitor 1 shown in FIG. 2. FIG. 4 is a cross-sectional view taken along the line IV-IV of the multilayer ceramic capacitor 1 shown in FIG. 2. FIG. 5 is an enlarged view of the V portion of the multilayer ceramic capacitor 1 shown in FIG. 2, and is a diagram showing an overview of a conductive resin layer 60.

The multilayer ceramic capacitor 1 includes a multilayer body 10 and external electrodes 40.

In FIGS. 1 to 4, an XYZ Cartesian coordinate system is shown. The length direction L of the multilayer ceramic capacitor 1 and the multilayer body 10 corresponds to the X direction. The width direction W of the multilayer ceramic capacitor 1 and the multilayer body 10 corresponds to the Y direction. The stacking (lamination) direction T of the multilayer ceramic capacitor 1 and the multilayer body 10 corresponds to the Z direction. Here, the cross section shown in FIG. 2 is also referred to as LT cross section. The cross section shown in FIG. 3 is also referred to as WT cross section. The cross section shown in FIG. 4 is also referred to as LW cross section.

As shown in FIGS. 1 to 4, the multilayer body 10 includes a first main surface TS1 and a second main surface TS2 which are opposite to each other in the stacking direction T, a first side surface WS1 and a second side surface WS2 which are opposite to each other in the width direction W orthogonal or substantially orthogonal to the stacking direction T, and a first end surface LS1 and a second end surface LS2 which are opposite to each other in the length direction L orthogonal or substantially orthogonal to the stacking direction T and the width direction W.

As shown in FIG. 1, the multilayer body 10 has a rectangular or substantially rectangular shape. It should be noted that the dimension of the multilayer body 10 in the length direction L is not necessarily longer than the dimension of the width direction W. The corners and ridges of the multilayer body 10 are preferably rounded. The corner is a portion where three surfaces of the multilayer body intersect, the ridge is a portion where two surfaces of the multilayer body intersect. It should be noted that unevenness or the like may be provided on a portion of or the entire surface of the multilayer body 10.

The dimensions of the multilayer body 10 are not particularly limited.

As shown in FIGS. 2 and 3, the multilayer body 10 includes an inner layer portion 11, and a first main surface-side outer layer portion 12 and a second main surface-side outer layer portion 13 which sandwich the inner layer portion 11 in the stacking direction T.

The inner layer portion 11 includes a plurality of dielectric layers 20 and a plurality of internal electrode layers 30. The inner layer portion 11 includes, in the stacking direction T, the internal electrode layer 30 located closest to the first main surface TS1 to the internal electrode layer 30 located closest to the second main surface TS2. In the inner layer portion 11, the plurality of internal electrode layers 30 are disposed opposite to each other with the dielectric layer 20 interposed therebetween. The inner layer portion 11 generates a capacitance and defines and functions as a capacitor.

The plurality of dielectric layers 20 are made of a dielectric material. The dielectric material may preferably be, for example, a dielectric ceramic including components such as $BaTiO_3$, $CaTiO_3$, $SrTiO_3$, or $CaZrO_3$. Furthermore, the dielectric material may include a secondary component such as, for example, a Mn compound, an Fe compound, a Cr compound, a Co compound, or a Ni compound in addition to the main component.

The thickness of the dielectric layer 20 is preferably about 0.5 µm or more and about 10 µm or less, for example. The number of the dielectric layers 20 to be stacked is preferably fifteen or more and 700 or less, for example. It should be noted that the number of the dielectric layers 20 refers to the total number of dielectric layers in the inner layer portion 11, and dielectric layers in the first main surface-side outer layer portion 12 and the second main surface-side outer layer portion 13.

The plurality of internal electrode layers 30 includes a plurality of first internal electrode layers 31 and a plurality of second internal electrode layers 32. The plurality of first internal electrode layers 31 and the plurality of second internal electrode layers 32 are alternately arranged in the stacking direction T of the multilayer body 10.

The first internal electrode layer 31 includes a first opposing portion 31A facing the second internal electrode layer 32, and a first lead-out portion 31B extending from the first opposing portion 31A to the first end surface LS1. The first lead-out portion 31B is exposed to the first end surface LS1.

The second internal electrode layer 32 includes a second opposing portion 32A facing the first internal electrode layer 31, and a second lead-out portion 32B extending from the second opposing portion 32A to the second end surface LS2. The second lead-out portion 32B is exposed to the second end surface LS2.

In the present preferred embodiment, the first opposing portion 31A and the second opposing portion 32A are opposed to each other with the dielectric layers 20 interposed therebetween, such that a capacitance is generated, and the characteristics of a capacitor are provided.

The shapes of the first opposing portion 31A and the second opposing portion 32A are not particularly limited, but are preferably rectangular or substantially rectangular. However, corners of the rectangular or substantially rectangular shape may be rounded, or the corners of the rectangular or substantially rectangular shape may be oblique. The shapes of the first lead-out portion 31B and the second lead-out portion 32B are not particularly limited, but are preferably rectangular or substantially rectangular. However, the corners of the rectangular or substantially rectangular shape may be rounded, or the corners of the rectangular or substantially rectangular shape may be oblique.

The dimension in the width direction W of the first opposing portion 31A and the dimension in the width direction W of the first lead-out portion 31B may be the same or substantially the same dimensions, or one of them may have a smaller dimension. The dimension in the width direction W of the second opposing portion 32A and the dimension in the width direction W of the second lead-out portion 32B may be the same or substantially the same dimensions, or one of them may have a narrower dimension.

The first internal electrode layer 31 and the second internal electrode layer 32 are each preferably made of a metal such as, for example, Ni, Cu, Ag, Pd, or Au, or a suitable conductive material such as an alloy including at least one of these metals. In a case in which an alloy is used, the first internal electrode layer 31 and the second internal electrode layer 32 may preferably be made of, for example, Ag—Pd alloy.

The thickness of each of the first internal electrode layer 31 and the second internal electrode layer 32 is preferably, for example, about 0.2 µm or more, and about 2.0 µm or less. The total number of the first internal electrode layers 31 and the second internal electrode layers 32 is preferably fifteen or more and 200 or less, for example.

The first main surface-side outer layer portion 12 is located close to the first main surface TS1 of the multilayer body 10. The first main surface-side outer layer portion 12 includes a plurality of dielectric layers 20 located between the first main surface TS1 and the internal electrode layer 30 closest to the first main surface TS1. The dielectric layer 20 used in the first main surface-side outer layer portion 12 may be the same or substantially the same as the dielectric layer 20 used in the inner layer portion 11.

The second main surface-side outer layer portion 13 is located close to the second main surface TS2 of the multilayer body 10. The second main surface-side outer layer portion 13 includes a plurality of dielectric layers 20 located between the second main surface TS2 and the internal electrode layer 30 closest to the second main surface TS2. The dielectric layer 20 used in the second main surface-side outer layer portion 13 may be the same or substantially the same as the dielectric layer 20 used in the inner layer portion 11.

It should be noted that the multilayer body 10 includes a counter electrode portion 11E. The counter electrode portion 11E is a portion where the first opposing portion 31A of the first internal electrode layer 31 and the second opposing portion 32A of the second internal electrode layer 32 are opposite to each other. The counter electrode portion 11E is a portion of the inner layer portion 11. FIG. 4 shows the range of the counter electrode portion 11E in the width direction W and in the length direction L. It should be noted that the counter electrode portion 11E is also referred to as a capacitor effective portion.

It should be noted that the multilayer body 10 includes a side surface-side outer layer portion WG. The side surface-side outer layer portion WG includes a first side surface-side outer layer portion WG1 and a second side surface-side outer layer portion WG2. The first side surface-side outer layer portion WG1 includes a dielectric layer 20 located between the counter electrode portion 11E and the first side surface WS1. The second side surface-side outer layer portion WG2 includes a dielectric layer 20 located between the counter electrode portion 11E and the second side surface WS2. FIGS. 3 and 4 each show the ranges of the first side surface-side outer layer portion WG1 and the second side surface-side outer layer portion WG2 in the width direction W. It should be noted that the side surface-side outer layer portion WG is also referred to as a W gap or a side gap.

Furthermore, the multilayer body 10 includes an end surface-side outer layer portion LG. The end surface-side outer layer portion LG includes a first end surface-side outer layer portion LG1 and a second end surface-side outer layer portion LG2. The first end surface-side outer layer portion LG1 includes a dielectric layer 20 located between the counter electrode portion 11E and the first end surface LS1. The second end surface-side outer layer portion LG2 includes a dielectric layer 20 located between the counter electrode portion 11E and the second end surface LS2. FIGS. 2 and 4 each show the ranges of the first end surface-side outer layer portion LG1 and the second end surface-side outer layer portion LG2 in the length direction L. It should be noted that the end surface-side outer layer portion LG is also referred to as L gap or end gap.

The external electrodes 40 each include a first external electrode 40A at the first end surface LS1, and a second external electrode 40B at the second end surface LS2.

The first external electrode 40A is disposed on the first end surface LS1. The first external electrode 40A is connected to the first internal electrode layer 31. The first external electrodes 40A may be disposed on a portion of the first main surface TS1 and a portion of the second main surface TS2, and also on a portion of the first side surface WS1 and a portion of the second side surface WS2. In the present preferred embodiment, the first external electrode 40A extends from the first end surface LS1 to a portion of the first main surface TS1, a portion of the second main surface TS2, a portion of the first side surface WS1, and a portion of the second side surface WS2.

The second external electrode 40B is disposed on the second end surface LS2. The second external electrode 40B is connected to the second internal electrode layer 32. The second external electrodes 40B may be disposed on a portion of the first main surface TS1 and a portion of the second main surface TS2, and also on a portion of the first side surface WS1 and a portion of the second side surface WS2. In the present preferred embodiment, the second external electrode 40B extends from the second end surface LS2 to a portion of the first main surface TS1, a portion of the second main surface TS2, a portion of the first side surface WS1, and a portion of the second side surface WS2.

As described above, in the multilayer body 10, the capacitance is generated by the first opposing portion 31A of the first internal electrode layer 31 and the second opposing portion 32A of the second internal electrode layer 32 opposing each other with the dielectric layer 20 interposed therebetween. Therefore, characteristics of the capacitor are provided between the first external electrode 40A to which the first internal electrode layer 31 is connected and the second external electrode 40B to which the second internal electrode layer 32 is connected.

The first external electrode 40A includes a plurality of layers including a first conductive resin layer 60A and a first plated layer 70A provided on the first conductive resin layer 60A. In the present preferred embodiment, the first external electrode 40A includes a first foundation electrode layer 50A, a first conductive resin layer 60A provided on the first foundation electrode layer 50A, and a first plated layer 70A provided on the first conductive resin layer 60A. The first plated layer 70A includes a first Ni-plated layer 71A as a lower plated layer and a first Sn-plated layer 72A as an upper plated layer.

The second external electrode 40B includes a plurality of layers including a second conductive resin layer 60B and a second plated layer 70B provided on the second conductive resin layer 60B. In the present preferred embodiment, the second external electrode 40B includes a second foundation electrode layer 50B, a second conductive resin layer 60B provided on the second foundation electrode layer 50B, and a second plated layer 70B provided on the second conductive resin layer 60B. The second plated layer 70B includes a second Ni-plated layer 71B as a lower plated layer and a second Sn-plated layer 72B as an upper plated layer.

It should be noted that the basic configurations of each layer of the first external electrode 40A and the second external electrode 40B are the same or substantially the same. Furthermore, the first external electrode 40A and the second external electrode 40B are plane symmetric or substantially plane symmetric with respect to the WT cross-section at the center in the length direction L of the multilayer ceramic capacitor 1. Therefore, in a case in which it is not necessary to particularly distinguish between the first external electrode 40A and the second external electrode 40B, they may be collectively referred to as an external electrode 40. Furthermore, in a case in which it is not necessary to particularly distinguish between the first foundation electrode layer 50A and the second foundation electrode layer 50B, they may be collectively referred to as a foundation electrode layer 50. Furthermore, in a case in which it is not necessary to particularly distinguish between the first conductive resin layer 60A and the second conductive resin layer 60B, they may be collectively referred to as a conductive resin layer 60. Further, if there is no need to particularly distinguish between the first plated layer 70A and the second plated layer 70B, they are sometimes referred to as a plated layer 70 collectively. Furthermore, in a case in which it is not necessary to particularly distinguish between the first Ni-plated layer 71A and the second Ni-plated layer 71B, they may be collectively referred to as a Ni-plated layer 71. Furthermore, in a case in which it is not necessary to particularly distinguish between the first Sn-plated layer 72A and the second Sn-plated layer 72B, they may be collectively referred to as a Sn-plated layer 72.

The foundation electrode layer 50 includes a first foundation electrode layer 50A and a second foundation electrode layer 50B.

The first foundation electrode layer 50A is disposed on the first end surface LS1. The first foundation electrode layer 50A is connected to the first internal electrode layer 31. In the present preferred embodiment, the first foundation electrode layer 50A extends from the first end surface LS1 to a portion of the first main surface TS1, a portion of the second main surface TS2, a portion of the first side surface WS1, and a portion of the second side surface WS2.

The second foundation electrode layer 50B is disposed on the second end surface LS2. The second foundation electrode layer 50B is connected to the second internal electrode layer 32. In the present preferred embodiment, the second foundation electrode layer 50B extends from the second end surface LS2 to a portion of the first main surface TS1, a portion of the second main surface TS2, a portion of the first side surface WS1, and a portion of the second side surface WS2.

In the present preferred embodiment, the foundation electrode layer 50 is a fired layer. The fired layer includes a glass component and metal. The glass component of the fired layer preferably includes, for example, at least one selected from B, Si, Ba, Mg, Al, and Li. The metal of the fired layer metals preferably includes, for example, at least one selected from Cu, Ni, Ag, Pd, Ag—Pd alloy, and Au. The fired layer is obtained by applying a conductive paste including glass and metal to the multilayer body, and firing. The fired layer may be obtained by simultaneously firing a laminated (multilayer) chip including the internal electrode layers and the dielectric layers, and a conductive paste applied to the laminated chip, or alternatively may be obtained by firing the laminated chip including the internal electrode layers and the dielectric layers to thus obtain a multilayer body, followed by the conductive paste being applied to the multilayer body and firing being performed. It should be noted that, in a case of simultaneously firing the laminated chip including the internal electrode layers 30 and the dielectric layers 20, and the conductive paste applied to the laminated chip, it is preferable that the fired layer is formed by firing those obtained by adding a dielectric material in place of the glass component. Furthermore, the fired layer may include a plurality of layers.

The thickness of the first foundation electrode layer 50A located on the first end surface LS1 in the length direction is preferably, for example, about 3 μm or more and about 160 μm or less at the center or approximate center portion in the stacking direction T and the width direction W of the first foundation electrode layer 50A.

The thickness of the second foundation electrode layer 50B located on the second end surface LS2 in the length direction is preferably, for example, about 3 μm or more and about 160 μm or less at the center or approximate center portion in the stacking direction T and the width direction W of the second foundation electrode layer 50B.

In a case of extending the first foundation electrode layer 50A to a portion of the first main surface TS1 and a portion of the second main surface TS2, the thickness in the stacking direction of the first foundation electrode layer 50A provided at this portion is preferably, for example, about 3 μm or more and about 40 μm or less at the center or approximate center portion in the length direction L and the width direction W of the first foundation electrode layer 50A provided at this portion.

In a case of extending the first foundation electrode layer 50A to a portion of the first side surface WS1 and a portion of the second side surface WS2, the thickness in the width direction of the first foundation electrode layer 50A provided at this portion is preferably, for example, about 3 μm or more and about 40 μm or less at the center or approximate center portion in the length direction L and the stacking direction T of the first foundation electrode layer 50A provided at this portion.

In a case of extending the second foundation electrode layer 50B to a portion of the first main surface TS1 and a portion of the second main surface TS2, the thickness in the stacking direction of the second foundation electrode layer 50B provided at this portion is preferably, for example, about 3 μm or more and about 40 μm or less at the center or approximate center portion in the length direction L and the width direction W of the second foundation electrode layer 50B provided at this portion.

In a case of extending the first foundation electrode layer 50A to a portion of the first side surface WS1 and a portion of the second side surface WS2, the thickness in the width direction of the first foundation electrode layer 50A provided at this portion is preferably, for example, about 3 μm or more and about 40 μm or less at the center or approximate center portion in the length direction L and the stacking direction T of the first foundation electrode layer 50A provided at this portion.

It should be noted that the foundation electrode layer 50 is not limited to the fired layer, and may be a thin film layer, for example. The thin film layer is formed by a thin film forming method such as, for example, a sputtering method or a vapor deposition method, and is preferably, for example, a layer having a thickness of about 1 μm or less on which metal particles are deposited. Alternatively, the conductive resin layer 60 described later may be directly provided on the multilayer body 10 without providing the foundation electrode layer 50.

The conductive resin layer 60 includes a first conductive resin layer 60A and a second conductive resin layer 60B.

The first conductive resin layer 60A covers the first foundation electrode layer 50A. The second conductive resin layer 60B covers the second foundation electrode layer 50B.

The thickness in the length direction of the first conductive resin layer 60A located adjacent to the first end surface LS1 is preferably, for example, about 50 μm or more and about 150 μm or less in the central portion in the stacking direction T and the width direction W of the first conductive resin layer 60A.

The thickness in the length direction of the second conductive resin layer 60B located adjacent to the second end surface LS2 is preferably, for example, about 50 μm or more and about 150 μm or less in the central portion in the stacking direction T and the width direction W of the second conductive resin layer 60B.

When extending the first conductive resin layer 60A to a portion of the first main surface TS1 and a portion of the second main surface TS2, the thickness in the stacking direction of the first conductive resin layer 60A provided in this portion is preferably, for example, about 15 μm or more and about 60 μm or less at the central portion in the length direction L and the width direction W of the first conductive resin layer 60A provided in this portion.

When extending the first conductive resin layer 60A to a portion of the first side surface WS1 and a portion of the second side surface WS2, the thickness in the width direction of the first conductive resin layer 60A provided in this portion is preferably, for example, about 15 μm or more and about 60 μm or less at the central portion in the length direction L and the stacking direction T of the first conductive resin layer 60A provided in this portion.

When extending the second conductive resin layer 60B to a portion of the first main surface TS1 and a portion of the second main surface TS2, the thickness in the stacking direction of the second conductive resin layer 60B provided in this portion is preferably, for example, about 15 μm or more and about 60 μm or less at the central portion in the length direction L and the width direction W of the second conductive resin layer 60B provided in this portion.

When extending the second conductive resin layer 60B to a portion of the first side surface WS1 and a portion of the second side surface WS2, the thickness in the width direction of the second conductive resin layer 60B provided in this portion is preferably, for example, about 15 μm or more and about 60 μm or less at the central portion in the length direction L and the stacking direction T of the second conductive resin layer 60B provided in this portion.

FIG. 5 is an enlarged view of the V portion of the multilayer ceramic capacitor shown in FIG. 2, and is a diagram showing an overview of the conductive resin layer 60. As described above, since the first conductive resin layer 60A and the second conductive resin layer 60B have the same or substantially the same basic configuration, they will be collectively described as the conductive resin layer 60 with reference to FIG. 5. It should be noted that the same applies to the other layers of the first external electrode 40A and the second external electrode 40B. As shown in FIG. 5, the conductive resin layer 60 is provided on the foundation electrode layer 50. Furthermore, the plated layer 70, which will be described later, covers the conductive resin layer 60. The plated layer 70 includes the Ni-plated layer 71 and the Sn-plated layer 72.

The conductive resin layer 60 includes a resin portion 61, conductive fillers 62 dispersed in the resin portion 61, and metal particles 63 which are unevenly dispersed in a distribution different from the conductive fillers 62 in the conductive resin layer 60.

The resin portion 61 of the conductive resin layer 60 may include at least one selected from various known thermosetting resins such as, for example, epoxy resin, phenoxy resin, phenolic resin, urethane resin, silicone resin, and polyimide resin. Among them, epoxy resin, which is excellent in heat resistance, moisture resistance, adhesion, etc., is one of the most preferably resins. Furthermore, it is preferable that the resin portion 61 of the conductive resin layer 60 includes a curing agent together with a thermosetting resin. When epoxy resin is used as a base resin, the curing agent of the epoxy resin may be various known compounds such as, for example, a phenolic system, an amine system, an acid anhydride system, an imidazole system, an active ester system, and an amide imide system.

The resin portion 61 included in the conductive resin layer 60 preferably includes, for example, about 25 vol % or more and about 65 vol % or less with respect to the volume of the entire conductive resin layer 60.

Since the conductive resin layer 60 includes such a resin portion 61, the conductive resin layer 60 is more flexible than the conductive layer made of, for example, a fired product of a plating film or a conductive paste. Therefore, even when an impact caused by physical shock or thermal cycle is applied to the multilayer ceramic capacitor 1, the conductive resin layer 60 defines and functions as a buffer layer. Therefore, the conductive resin layer 60 reduces or prevents the occurrence of cracking in the multilayer ceramic capacitor 1.

The conductive filler 62 is dispersed in the resin portion 61 in a uniform or substantially uniform distribution. The conductive filler 62 mainly enables the electric conductivity of the conductive resin layer 60. More specifically, as a result of the plurality of conductive fillers 62 being in contact with each other, an energization path is provided inside the conductive resin layer 60, and thus, electrical conductivity is provided between the foundation electrode layer 50 and the plated layer 70. It should be noted that a plurality of conductive fillers 62 are also in contact with each other in the depth direction of FIG. 5.

Metal including the conductive fillers 62 may preferably be, for example, Au, Ag, Cu, Ni, Sn, Bi, Zn or an alloy including them. The conductive fillers 62 preferably include Ag, for example. The conductive fillers 62 are each a metal powder of Ag, for example. Ag is suitable as an electrode material because of its lowest resistivity among metals. In addition, since Ag is a noble metal, it is difficult to oxidize and has high weatherability. Therefore, the metal powder of Ag is suitable as the conductive fillers 62.

Furthermore, the conductive fillers 62 may each be a metal powder coated on the surface of the metal powder with Ag. When using those coated with Ag on the surface of the metal powder, the metal powder is preferably, for example, Cu, Ni, Sn, Bi, or an alloy powder thereof. In order to make the metal of the base material inexpensive while maintaining the characteristics of Ag, it is preferable to use a metal powder coated with Ag.

Furthermore, the conductive filler 62 may be formed by, for example, subjecting Cu and Ni to an oxidation prevention treatment. Furthermore, the conductive filler 62 may be, for example, a metal powder coated with Sn, Ni, and Cu on the surface of the metal powder. When using those coated with Sn, Ni, and Cu on the surface of the metal powder, the metal powder is preferably, for example, Ag, Cu, Ni, Sn, Bi, or an alloy powder thereof.

The shape of each of the conductive fillers 62 is not particularly limited. For the conductive filler 62, a spherical metal powder, a flat metal powder, or the like, for example, can be used. However, it is preferable to use a mixture of a spherical metal powder and a flat metal powder.

The average particle size of the conductive fillers 62 may be, for example, about 0.2 μm or more. The average particle size of the conductive fillers 62 is preferably, for example, about 0.5 μm or more and about 20 μm or less, and more preferably, for example, about 1 μm or more and about 10 μm or less.

It is preferable that the conductive filler 62 included in the conductive resin layer 60 includes, for example, about 35 vol % or more and about 75 vol % or less with respect to the volume of the entire conductive resin layer 60. More preferably, it is, for example, about 40 vol % or more and about 60 vol % or less.

Here, the abundance ratio of the conductive fillers 62 to the resin portion 61 is equal or substantially equal on the side of the conductive resin layer 60 close to the multilayer body 10 and on the side of the plated layer 70 of the conductive resin layer 60. As will be described later, a conductive resin paste for forming the conductive resin layer 60 is produced by stirring and mixing the thermosetting resin and the conductive fillers 62. Therefore, the conductive fillers 62 are dispersed in the conductive resin paste in a uniform or substantially uniform distribution. Therefore, also in the conductive resin layer 60 after application and heat treatment, the conductive fillers 62 are provided in a dispersed manner in the resin portion 61 in a uniform or substantially uniform distribution.

The metal particles 63 are dispersed unevenly in a distribution differing from that of the conductive fillers 62 in the conductive resin layer 60. The metal particles 63 improve electrical contact within the conductive resin layer 60 and electrical contact between the conductive resin layer 60 and the plated layer 70.

More specifically, a plurality of metal particles 63 are in contact with one another, and the metal particles 63 are also in contact with the conductive fillers 62, such that the electrical contact between the conductive fillers 62 is increased. That is, by the conductive fillers 62 being electrically connected with each other via the metal particles 63, the electrical contact probability in the conductive resin layer 60 is increased. In this way, the metal particles 63 are provided among the plurality of conductive fillers 62 in the resin portion 61, thus providing an energization path between the plurality of conductive fillers 62.

Furthermore, the abundance ratio of the metal particles 63 to the resin portion 61 is higher on the side of the plated layer 70 of the conductive resin layer 60 than on the side of the conductive resin layer 60 close to the multilayer body 10. More specifically, the metal particles 63 are provided at a higher density on the side of the surface layer portion of the conductive resin layer 60 than on the side of the conductive resin layer 60 close to the multilayer body 10. As a result, plating favorably deposits on the surface of the conductive resin layer 60. Therefore, since the metal particles 63 of the surface layer of the conductive resin layer 60 and the plated layer 70 are in good contact with each other, the conductivity between the conductive resin layer 60 and the plated layer 70 is increased.

Thus, in addition to the conductive fillers 62, since the conductive resin layer 60 includes the metal particles 63 which are unevenly dispersed in a distribution differing from that of the conductive fillers 62, electric conductivity in the external electrodes 40 is increased, a result of which ESR of the multilayer ceramic capacitor 1 is decreased.

The metal particles 63 refer to those in a metal particle state by converting an organometallic complex or metal ion impregnated in an impregnating step described later, and refer to those in the state of the metal primary particles 63A. Furthermore, when the metal primary particles 63A are agglomerated or the like to form the state of the metal secondary particles 63B, the metal particles 63 indicate the metal secondary particles 63B or the metal primary particles 63A of the metal secondary particles 63B.

As defined in JIS H7008:2002, "primary particle" in the "Metal Fine Particle Term", a metal primary particle indicates a particle produced by growing a single crystalline nucleus. In addition, as defined in JIS H7008:2002, "secondary particle" in the "Metal Fine Particle Term", a metal secondary particle indicates a particle produced by coalescence growth, aggregation, solidification, or the like of the primary particles.

The metal particles 63 may include at least one selected from Au, Pt, Pd, Ag, Cu, and the like, for example. It is preferable that the metal particles 63 include low specific resistance and are likely to be precipitated as metal by being reduced after the impregnating step described later. The metal particles 63 preferably include Pd, for example.

The metal particles 63 may be the same metal as the metal included in the conductive fillers 62. For example, if the metal particles 63 are the same metal as the metal included in the conductive fillers 62, potential corrosion due to contact of dissimilar metals can be prevented.

On the other hand, the metal particles 63 may be a metal different from the metal included in the conductive fillers 62. For example, the metal particles 63 may be a metal having a lower ionization tendency than the metal included in the conductive fillers 62. For example, when the conductive fillers 62 includes Ag, the metal particles 63 may be Au, Pt, or Pd. When the conductive fillers 62 are Cu, the metal particles 63 may be Au, Pt, Pd, or Ag. Since metal having a low ionization tendency is likely to be reduced after being impregnated in a state of an organometallic complex or metal ion, it is likely to be precipitated as metal.

The conductive resin layer 60 may include a precursor before the metal particles 63 are formed. For example, the conductive resin layer 60 includes an organometallic complex or metal ion. For example, when Pd is used as the metal particles 63, the conductive resin layer 60 may include an organic Pd complex (organopalladium complex) or a Pd ion (palladium ion).

As described above, the metal particles 63 include the metal primary particles 63A and the metal secondary particles 63B including the metal primary particles 63A. The metal primary particles 63A are metal fine particles each having a smaller mean particle size than the conductive fillers 62. The average particle size of the metal primary particles 63A is preferably, for example, about one tenth or less of the average particle size of the conductive fillers 62. The average particle size of the metal primary particles 63A may be about one hundredth or less of the average particle size of the conductive fillers 62. For example, when the average particle size of the conductive fillers 62 is about 1 μm or more and about 10 μm or less, the average particle size of the metal primary particles 63A may be about 100 nm or less (about 0.1 μm or less). The average particle size of the metal primary particles 63A is preferably about 5 nm or more and about 50 nm or less (about 0.005 μm or more and about 0.05 μm or less), for example.

In the state of the metal primary particles 63A, since the metal particles 63 are sufficiently smaller than the conductive fillers 62, the metal particles 63 are likely to enter the gap of the plurality of conductive fillers 62. Therefore, the metal particles 63 effectively provide an energization path between the plurality of conductive fillers 62. That is, by using sufficiently smaller metal particles 63 than the conductive fillers 62, the electrical contact in the conductive resin layer 60 is increased, and the advantageous effect of decreasing ESR can be easily obtained.

The metal particles 63 included in the conductive resin layer 60 are each preferably included in an amount of, for example, about 0.5 vol % or more and about 20 vol % or less with respect to the volume of the entire conductive resin layer 60.

The abundance ratio of the metal particles 63 to the resin portion 61 is higher on the side of the plated layer 70 of the conductive resin layer 60 than on the side of the conductive resin layer 60 close to the multilayer body 10.

Furthermore, as described above, since the conductive fillers 62 are provided in a uniform or substantially uniform distribution in the resin portion 61, the abundance ratio of the metal particles 63 to the conductive fillers 62 is higher on the side of the plated layer 70 of the conductive resin layer 60 than on the side of the conductive resin layer 60 close to the multilayer body 10.

As will be described later, the metal particles 63 are provided in the conductive resin layer 60 by impregnating the precursors thereof in the surface of the resin portion 61 after thermal curing. Therefore, the metal particles 63 are provided from the boundary portion between the conductive resin layer 60 and the plated layer 70 across the side of the conductive resin layer 60 close to the multilayer body 10. Furthermore, in the conductive resin layer 60, the metal particles 63 are provided at a higher density in the vicinity of the boundary portion of the conductive resin layer 60 and the plated layer 70.

Hereinafter, non-limiting examples of methods of measuring various parameters relating to the conductive resin layer 60 in the present preferred embodiment will be described.

A method of measuring the average particle size of the conductive fillers 62 will be described. Here, the average particle size refers to number-based arithmetic average area size. First, the multilayer ceramic capacitor 1 including the external electrodes 40 is processed into thin pieces by focused ion beam (FIB) processing. Next, a thin sample thereof is imaged by transmission electron microscopy (TEM) or scanning electron microscopy (SEM). Thereafter, by analysis of the captured TEM image or SEM image, the boundary of the conductive fillers 62 in the conductive resin layer 60 of the external electrodes 40 is detected. It should be noted that, among the transmission electron microscope (TEM) or the scanning electron microscope (SEM), an appropriate one is used on the sample. Next, the area equivalent diameter based on the cross-sectional area of the conductive fillers 62 where the boundary is detected is calculated as the particle size of the conductive fillers 62. Furthermore, the particle sizes of the plurality of conductive fillers 62 in the measurement region are calculated respectively, and the number-based arithmetic average is calculated as the average particle size. It should be noted that the measurement region can be appropriately set so that the number of the conductive fillers 62 in the measurement region is about 30 or more and about 300 or less, for example. Furthermore, the average particle size is calculated based on the particle sizes of 30 or more conductive fillers 62.

A method of measuring the average particle size of the metal primary particles 63A will be described. First, the multilayer ceramic capacitor 1 including the external electrodes 40 is processed into thin pieces by FIB processing. Next, this thin sample is imaged by TEM or SEM. Thereafter, by the analysis of the captured TEM image or SEM image, the boundary of the metal primary particles 63A in the conductive resin layer 60 of the external electrodes 40 is detected. It should be noted that, among TEM or SEM, the more appropriate one is used on the sample. Next, the area equivalent diameter based on the cross-sectional area of the metal primary particles 63A where the boundary is detected is calculated as the particle size of the metal primary particles 63A. Furthermore, the particle sizes of the metal primary particles 63A in the measurement region in the imaging range are calculated, and the number-based arithmetic average is calculated as the average particle size. It should be noted that the measurement region can be appropriately set so that the number of the metal primary particles 63A in the measurement region is about 30 or more and about 300 or less, for example. Furthermore, the average particle size is calculated based on the particle sizes of the 30 or more metal primary particles 63A. The metal particles 63 whose particle size is to be measured can be identified as the metal primary particles 63A. When the metal primary particles 63A of the metal secondary particles 63B can be identified, the particle size of the identified metal primary particles 63A are measured.

A method of measuring the abundance ratio of the conductive fillers 62 and the abundance ratio of the metal particles 63 will be described. First, the multilayer ceramic capacitor 1 including the external electrodes 40 is processed into thin pieces by FIB processing. The thin sample is then imaged by TEM. Thereafter, by image analysis of the captured TEM image, the resin portion 61, the conductive fillers 62, and the metal particles 63 are determined. Here, since the conductive fillers 62 and the metal particles 63 have different average particle sizes, the conductive fillers 62 and the metal particles 63 are determined based on the information or the like of the size on the TEM image. The determination process may be an automatic process or a manual process. It should be noted that, when the shapes of the conductive fillers 62 and the metal particles 63 are different from each other, the conductive fillers 62 and the metal particles 63 may be discriminated using the shape coefficient. Furthermore, when the materials of the conductive fillers 62 and the metal particles 63 differ from each other, the conductive fillers 62 and the metal particles 63 may be determined by utilizing mapping by an electronic microprobe analyzer (EPMA). It should be noted that these discrimination methods can also be used at the time of measuring the conductive fillers 62 or the average particle size.

Furthermore, in the TEM image, by calculating the ratio of the area of the portion indicating the conductive fillers 62 to the area of the portion indicating the resin portion 61, the abundance ratio of the conductive fillers 62 with respect to the resin portion 61 is calculated. Furthermore, in the TEM image, by calculating the ratio of the area of the portion indicating the metal particles 63 to the area of the portion indicating the resin portion 61, the abundance ratio of the metal particles 63 with respect to the resin portion 61 is calculated. Furthermore, in the TEM image, by calculating the ratio of the area of the portion indicating the metal particles 63 to the area of the portion indicating the conductive fillers 62, the abundance ratio of the metal particles 63 to the conductive fillers 62 is calculated.

For the abundance ratio, for example, by equally or approximately equally dividing the conductive resin layer 60 into two portions in the thickness direction, the abundance ratio can be calculated in each of the divided areas. Thus, for example, the abundance ratio of metal particles 63 to the resin portion 61 in the area on the side denoted by the arrow J in FIG. 5, i.e., on the side of the conductive resin layer 60 close to the multilayer body 10, and the abundance ratio of metal particles 63 to the resin portion 61 in the area on the side denoted by the arrow K in FIG. 5, i.e., on the side of the plated layer 70 of the conductive resin layer 60, are calculated, such that comparison of these abundance ratios becomes possible. It should be noted that, in the present preferred embodiment, when the conductive resin layer 60 is divided equally or substantially equally into three or four portions in the thickness direction, the abundance ratio of the metal particles 63 to resin portion 61 becomes higher approaching the side of the plated layer 70 of the conductive resin layer 60. It should be noted that, when calculating the respective abundance ratios, the measurement regions by TEM in the respective divided areas are set to the same or substantially the same size. For example, when calculating the abundance ratio of the metal particles 63 to the resin portion 61, the measurement region is set to, for example, about 0.5 μm×about 0.5 μm in the case of measurement in any of the divided areas.

The plated layer 70 includes the first plated layer 70A and the second plated layer 70B.

The first plated layer 70A covers the first conductive resin layer 60A. The second plated layer 70B covers the second conductive resin layer 60B.

The plated layer 70 may include at least one selected, for example, from Cu, Ni, Sn, Ag, Pd, Ag—Pd alloy, and Au. The plated layer 70 may include a plurality of layers. The plated layer 70 is preferably a two-layer structure including the Ni-plated layer 71 and the Sn-plated layer 72, for example. The Ni-plated layer 71 prevents the foundation electrode layer 50 and the conductive resin layer 60 from being eroded by solder when mounting the multilayer ceramic capacitor 1. The Sn-plated layer 72 improves the wettability of the solder when mounting the multilayer ceramic capacitor 1. This facilitates the mounting of the multilayer ceramic capacitor 1.

In the present preferred embodiment, the first plated layer 70A includes a two-layer structure including the Ni-plated layer 71A as a lower plated layer, and the Sn-plated layer 72A as an upper plated layer. Furthermore, the second plated layer 70B includes a two-layer structure including the Ni-plated layer 71B as a lower plated layer, and the Sn-plated layer 72B as an upper plated layer.

The thickness of each of the Ni-plated layer 71A and the Sn-plated layer 72A is preferably about 1 μm or more and about 15 μm or less, for example.

It should be noted that, in the present preferred embodiment, since the conductive resin layer 60 defining and functioning as a lower layer of the plated layer 70 includes the conductive fillers 62 and the metal particles 63 described above, the plated layer 70 is preferably adhered to the conductive resin layer 60.

As described above, the multilayer ceramic capacitor 1 according to the present preferred embodiment includes the multilayer body 10 including the plurality of dielectric layers 20 which are stacked and the plurality of internal electrode layers which are stacked, and the external electrodes 40, each connected to the internal electrode layers 30, in which the external electrodes 40 each include the conductive resin layer 60 and the plated layer 70 provided on the conductive resin layer 60, the conductive resin layer 60 includes the resin portion 61, the conductive fillers 62 dispersed in the resin portion 61, and the metal particles 63 which are dispersed unevenly in a distribution differing from that of the conductive fillers 62 in the conductive resin layer 60, and an abundance ratio of the metal particles 63 to the resin portion 61 is higher on a side of the plated layer 70 of the conductive resin layer 60 than on a side of the conductive resin layer 60 close to the multilayer body 10.

More specifically, the multilayer ceramic capacitor 1 according to the present preferred embodiment includes the multilayer body 10 including the plurality of dielectric layers 20 that are stacked and the plurality of internal electrode layers 30 that are stacked, the first main surface TS1 and the second main surface TS2 which are opposite to each other in the stacking direction T, the first side surface WS1 and the second side surface WS2 which are opposite to each other in the width direction W orthogonal or substantially orthogonal to the stacking direction T, and the first end surface LS1 and the second end surface LS2 which are opposite to each other in the length direction L orthogonal or substantially orthogonal to the stacking direction T and the width direction W. The multilayer ceramic capacitor 1 also includes the first external electrode 40A provided on the first end surface LS1, and the second external electrode 40B provided on the second end surface LS2. The plurality of internal electrode layers 30 include first internal electrode layers 31 each exposed at the first end surface LS1 of the multilayer body and connected to the first external electrode 40A, and the second internal electrode layers 32 each exposed at the second end surface of the multilayer body 10 and connected to the second external electrode 40B. The first external electrode 40A includes the first conductive resin layer 60A and the first plated layer 70A provided on the first conductive resin layer 60A. The second external electrode 40B includes the second conductive resin layer 60B and the second plated layer 70B provided on the second conductive resin layer 60B. The first conductive resin layer 60A and the second conductive resin layer 60B each include the resin portion 61, the conductive fillers 62 dispersed in the resin portion 61, and metal particles 63 dispersed unevenly in a distribution differing from that of the conductive fillers 62 in the first conductive resin layer 60A and the second conductive resin layer 60B. The abundance ratio of the metal particles 63 to the resin portion 61 is higher on the side of the plated layer 70 of the first conductive resin layer 60A than the side of the first conductive resin layer 60A close to the multilayer body 10, and higher on the side of the plated layer 70 of the second conductive resin layer 60B than the side of the second conductive resin layer 60B close to the multilayer body 10.

In addition, when defining the dimension in the length direction of the multilayer ceramic capacitor 1 including the multilayer body 10 and the external electrode 40 as the L dimension, the L dimension is preferably about 0.2 mm or more and about 10 mm or less, for example. In addition, when defining the dimension in the stacking direction of the multilayer ceramic capacitor 1 as the T dimension, the T dimension is preferably about 0.1 mm or more and about 10 mm or less, for example. Furthermore, when defining the dimension in the width direction of the multilayer ceramic capacitor 1 as the W dimension, the W dimension is preferably about 0.1 mm or more and about 10 mm or less, for example.

Next, a non-limiting example of a method of manufacturing the multilayer ceramic capacitor 1 of the present preferred embodiment will be described.

A dielectric sheet for the dielectric layer 20 and a conductive paste for the internal electrode layer 30 are provided. The conductive paste for the dielectric sheet and the internal electrode includes a binder and a solvent. Known binders and solvents may be used.

On the dielectric sheet, the conductive paste for the internal electrode layer 30 is printed in a predetermined pattern by, for example, screen printing or gravure printing. Thus, the dielectric sheet in which the pattern of the first internal electrode layer 31 is formed, and the dielectric sheet in which the pattern of the second internal electrode layer 32 is formed are provided.

By a predetermined number of dielectric sheets in which the pattern of the internal electrode layer is not printed being stacked, a portion defining and functioning as the first main surface-side outer layer portion 12 on the side of the first main surface TS1 is formed. On top thereof, by the dielectric sheet in which the pattern of the first internal electrode layer 31 is printed and the dielectric sheet in which the pattern of the second internal electrode layer 32 is printed being sequentially stacked, a portion defining and functioning as the inner layer portion 11 is formed. On the portion defining and functioning as the inner layer portion 11, by a predetermined number of the dielectric sheets in which the pattern of the internal electrode layer is not printed being stacked, a portion defining and functioning as the second main surface-side outer layer portion 13 on the side of the second main surface TS2 is formed. Thus, a stacked sheet is produced.

By the stacked sheet being pressed in the stacking direction by hydrostatic pressing, for example, a stacked block is produced.

By the stacked block being cut to a predetermined size, a laminated (multilayer) chip is cut out. At this time, corners and ridges of the laminated chip may be rounded by barrel polishing or the like.

The laminated chip is fired to produce the multilayer body 10. The firing temperature depends on the materials of the dielectric layer 20 and the internal electrode layer 30. However, the firing temperature is preferably about 900° C. or more and about 1400° C. or less, for example.

The conductive paste defining and functioning as the foundation electrode layer 50 is applied to both end surfaces of the multilayer body 10. In the present preferred embodiment, the foundation electrode layer 50 is a fired layer. For example, a conductive paste including a glass component and metal is applied to the multilayer body 10 by, for example, a method such as dipping. Thereafter, a firing process is performed to form the foundation electrode layer 50. The temperature of the firing process at this time is preferably about 700° C. or higher and about 900° C. or lower, for example.

Next, the conductive resin layer 60 is formed. It should be noted that the conductive resin layer 60 may be formed on the surface of the foundation electrode layer 50, or may be formed directly on the multilayer body 10. In the present preferred embodiment, the conductive resin layer 60 is formed on the surface of the foundation electrode layer 50.

First, a conductive resin paste is provided in which the conductive fillers 62 are dispersed in a thermosetting resin as a base resin defining and functioning as the resin portion 61. This conductive resin paste is produced by stirring and mixing the thermosetting resin and the conductive fillers 62. Therefore, the conductive fillers 62 are dispersed in a uniform distribution in the conductive resin paste. Here, the thermosetting resin is, for example, an epoxy resin. The conductive filler 62 is a metal powder of Ag, for example.

Thereafter, the conductive resin paste is applied onto the foundation electrode layer 50, and heat treatment is preferably performed at a temperature of about 250° C. or higher and about 550° C. or lower, for example. As a result, the resin portion 61 is thermally cured. The atmosphere at the time of the heat treatment is preferably an air atmosphere or a $N_2$ atmosphere, for example. Furthermore, in order to prevent scattering of the resin and to prevent oxidation of the metal component including the conductive fillers 62, the oxygen concentration is preferably about 100 ppm or less, for example.

It should be noted that the conductive fillers 62 are dispersed in a uniform or substantially uniform distribution even in the resin portion 61 after thermal curing. Therefore, the abundance ratio of the conductive fillers 62 to the resin portion 61 is equal or substantially equal on the side of the conductive resin layer 60 close to the multilayer body 10 and on the side of the conductive resin layer 60 on which the plated layer 70 is applied.

Next, an organometallic complex or metal ion which converts to the metal particles 63 is impregnated into the resin portion 61 after heat curing.

For example, the multilayer body 10 provided with the resin portion 61 is subjected to an atmosphere of a supercritical fluid in which the organometallic complex is dissolved. Thus, swelling of the resin portion 61 and impregnating of the organometallic complex into the swollen resin portion 61 are simultaneously performed.

The supercritical fluid may include at least one selected from, for example, supercritical fluids such as $CO_2$, $N_2$, and $H_2O$. However, the supercritical fluid is preferably a supercritical $CO_2$ having high solubility. It should be noted that the critical temperature of $CO_2$ is about 31° C., and the critical pressure is about 73 atm. The supercritical $CO_2$ contacts the resin portion 61 under conditions of the critical temperature or higher and the critical pressure or higher. Examples of an apparatus for generating a supercritical fluid include a syringe pump.

The organometallic complex may be any metal which is dissolved in a supercritical fluid, and may be, for example, an organometallic complex containing Au, Pt, Pd, Ag, and Cu. However, the organometallic complex is preferably, for example, an organic Pd complex (organopalladium complex).

An organometallic complex is dissolved in a supercritical fluid, and then the supercritical fluid is brought into contact with the resin portion 61. Alternatively, while dissolving the organometallic complex in the supercritical fluid, the supercritical fluid may be brought into contact with the resin portion 61. The method of bringing the supercritical fluid into contact with the resin portion 61 is not particularly limited. For example, the multilayer body 10 including the resin portion 61 is left in a container having pressure resistance for a fixed time so that the resin portion 61 comes into contact with the supercritical fluid in which the organometallic complex is dissolved. Thus, the resin portion 61 is impregnated with the organometallic complex.

By the impregnation treatment, the organometallic complex permeates into the interior of the resin portion 61, and is also provided in the gap of the plurality of conductive fillers 62. Furthermore, the organometallic complex is provided at a higher density in the vicinity of the surface of the resin portion 61 than on the side of the resin portion 61 close to the multilayer body 10.

The organometallic complex provided in the vicinity of the surface of the resin portion 61 and the organometallic complex permeating into the interior of the resin portion 61 are subsequently reduced by heat treatment or chemical reduction treatment, and convert into the metal particles 63. Thus, the conductive resin layer 60 including the metal particles 63 is formed.

By the processing using the supercritical fluid and the organometallic complex, the metal particles 63 are at a high density on the side of the conductive resin layer 60 on which the plated layer 70 is applied. Furthermore, the metal particles 63 are at a lower density on the side of the conductive resin layer close to the multilayer body 10 than on the side of the conductive resin layer 60 on which the plated layer 70 is applied.

It should be noted that, instead of treatment using a supercritical fluid and an organometallic complex, it is also possible to use a treatment using a solution in which metal ion is dissolved.

In this case, first, a swelling treatment using an organic solution, etc. is performed on the resin portion 61 provided in the multilayer body 10. Next, the swollen resin portion 61 is immersed in a solution in which metal ion is dissolved. As a result, the metal ion to be converted into the metal particles 63 is impregnated into the resin portion 61 after thermal curing.

The metal ions to be impregnated may be, for example, ions of Au, Pt, Pd, Ag, and Cu. However, the metal ion is preferably Pd ion (palladium ion), for example. It should be noted that the metal ion is preferably a metal ion having a valence of 1 or more and 4 or less. When Pd ion is used, for example, Pd ion having a valence of 2 is preferably used.

The metal ion on the surface of the resin portion 61 and the metal ion permeating into the interior of the resin portion 61 are subsequently reduced by heat treatment or chemical reduction treatment, and are converted into the metal particles 63. Thus, the conductive resin layer 60 including the metal particles 63 is formed.

By the treatment using a solution in which such metal ion is dissolved as well, the metal particles 63 are at high density on the side of the conductive resin layer 60 on which the plated layer 70 is applied. Furthermore, the metal particles 63 are at a lower density on the side of the conductive resin layer close to the multilayer body 10 than on the side of the conductive resin layer 60 on which the plated layer 70 is applied.

It should be noted that, since the organometallic complex and the metal ion which convert to the metal particles 63 used in the impregnating process are sufficiently smaller than the conductive fillers 62, they are likely to enter the gap of the plurality of conductive fillers 62 by the impregnating treatment. Thus, the metal particles 63 converted from the organometallic complex and the metal ion can easily form an energization path between the plurality of conductive fillers 62.

It should be noted that the metal particles 63 used in impregnating include Au, Pt, Pd, Ag, and Cu, and preferably include Au, Pt, and Pd, for example. More preferably, the metal particles 63 include Pd, for example. However, these metals are expensive. Therefore, when the conductive resin paste is produced, if the metal particles 63 are also stirred and mixed into the base resin, the metal particles 63 are dispersed and in a uniform distribution Zin the conductive resin paste in the same or substantially the same manner as the conductive fillers 62. In this case, a situation occurs in which many metal particles 63 are also at a location which is difficult to contribute to a decrease of ESR and the improvement in plating defects, leading to a cost increase. However, by impregnating with the organometallic complex or the metal ion converted into the metal particles 63 after curing of the resin portion 61, it is possible to reduce the use amount of the metal particles 63 and to reduce or prevent an increase in cost, while achieving a decreased ESR and an improvement in plating defects.

In particular, in a case in which the conductive fillers 62 included in the conductive resin layer 60 are included in an amount of about 35 vol % or more and about 75 vol % or less, and more preferably, about 40 vol % or more and about 60 vol % or less, with respect to the volume of the entire conductive resin layer 60, the resin portion 61 of the conductive resin layer 60 is impregnated with the organometallic complex or the metal ion as a precursor of the metal particles 63, such that it is possible to more effectively decrease ESR and improve plating defects, while reducing or preventing an increase in cost.

Thereafter, the plated layer 70 is formed on the surface of the conductive resin layer 60. In the present preferred embodiment, the Ni-plated layer 71 and the Sn-plated layer 72 are formed on the conductive resin layer 60. The Ni-plated layer 71 and the Sn-plated layer 72 are sequentially formed, for example, by a barrel plating method. The multilayer ceramic capacitor 1 is manufactured by the above-described manufacturing method.

As described above, the non-limiting example of a manufacturing method of the multilayer ceramic capacitor 1 of the present preferred embodiment includes the steps of mixing, stirring, and dispersing the conductive fillers 62 in the base resin defining and functioning as the resin portion 61 of the conductive resin layer 60, applying the base resin in which the conductive fillers 62 are dispersed to a portion at which the internal electrode layer 30 of the multilayer body 10 is exposed, curing the applied base resin to form the resin portion 61, contacting the resin portion 61 with a solvent in which an organometallic complex or metal ion which converts to the metal particles 63 is dissolved, and impregnating the resin portion 61 with the organometallic complex or the metal ion, and reducing the impregnated organometallic complex or metal ion to form an energization path between the conductive fillers 62 by the metal particles 63.

The configuration of the multilayer ceramic capacitor 1 is not limited to the configuration shown in FIGS. 1 to 4. For example, the multilayer ceramic capacitor 1 may include a two-portion structure, a three-portion structure, or a four-portion structure as shown in FIG. 6A, 6B, or 6C.

Figure 6A:
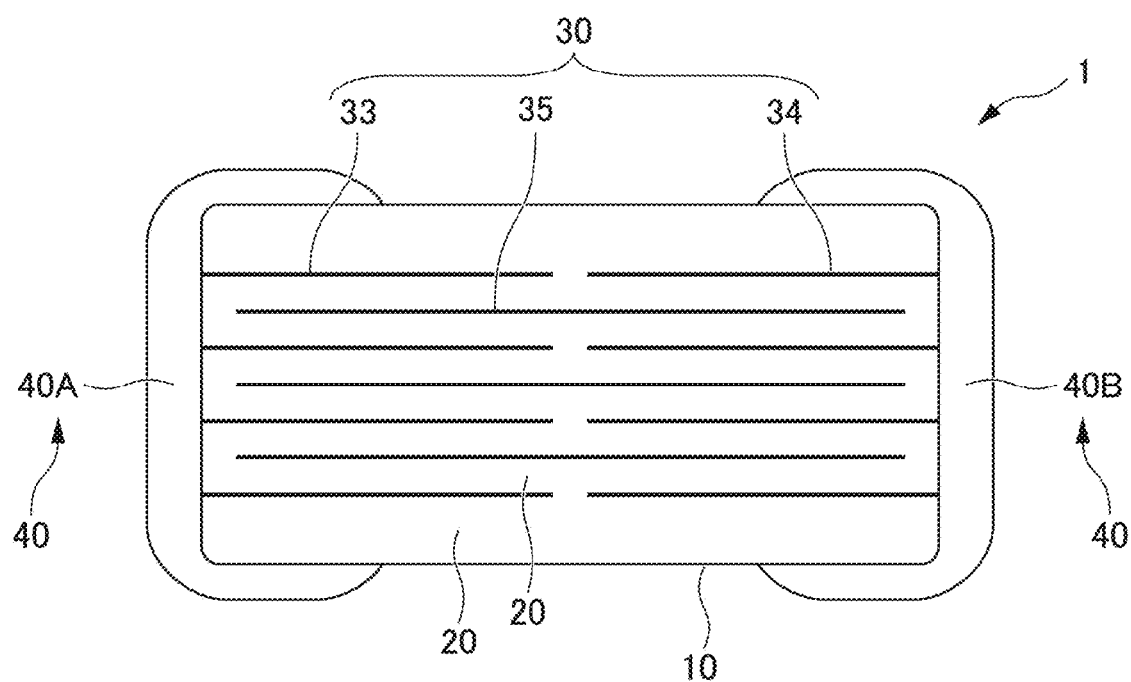
FIG. 6A is a diagram showing a multilayer ceramic capacitor including a two-portion structure according to a preferred embodiment of the present invention.
Figure 6B:
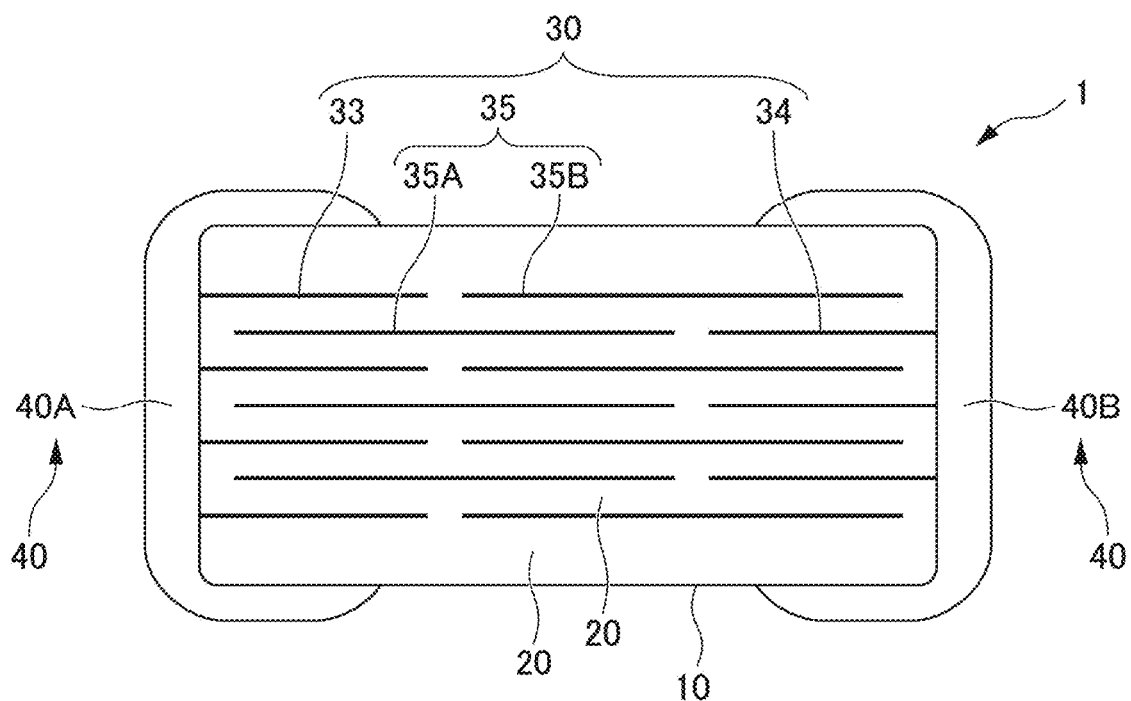
FIG. 6B is a diagram showing a multilayer ceramic capacitor including a three-portion structure according to a preferred embodiment of the present invention.
Figure 6C:
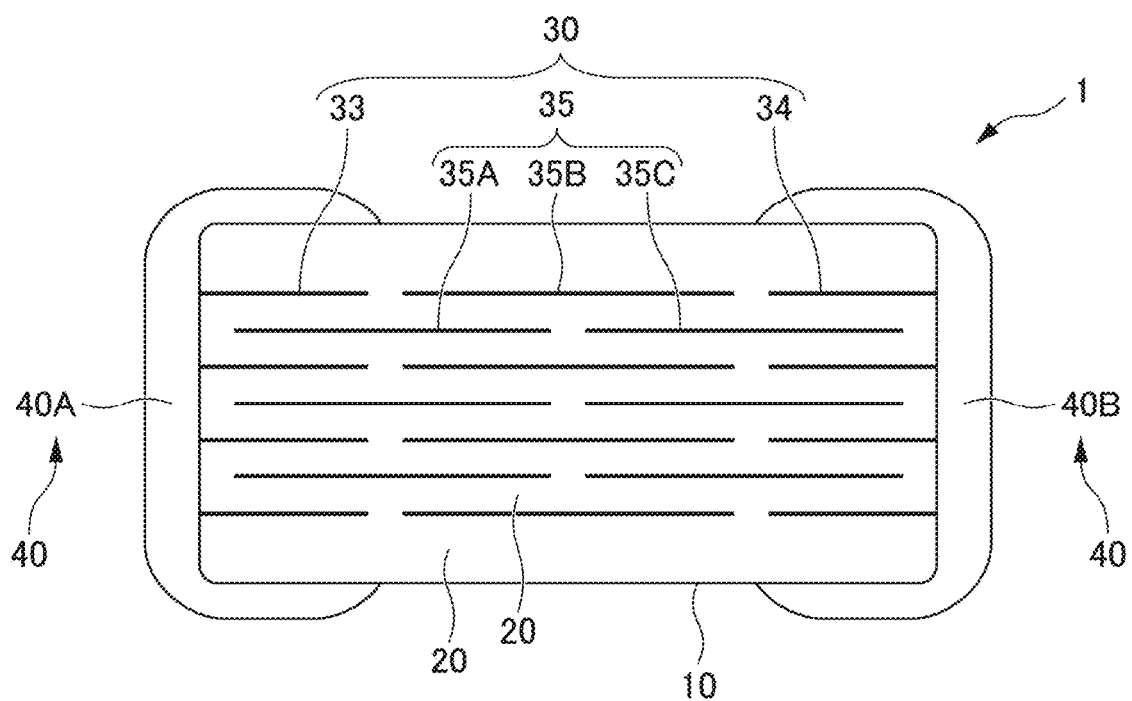
FIG. 6C is a diagram showing a multilayer ceramic capacitor including a four-portion structure according to a preferred embodiment of the present invention.

The multilayer ceramic capacitor 1 shown in FIG. 6A has a two-portion structure. The multilayer ceramic capacitor 1 includes, as the internal electrode layer 30, a floating internal electrode layer 35 which does not extend to either side of the first end surface LS1 and the second end surface LS2 in addition to the first internal electrode layer 33 and the second internal electrode layer 34. The multilayer ceramic capacitor 1 shown in FIG. 6B has a three-portion structure including, as the floating internal electrode layer 35, a first floating internal electrode layer 35A and a second floating internal electrode layer 35B. The multilayer ceramic capacitor 1 shown in FIG. 6C has a four-portion structure including, as the floating internal electrode layer 35, the first floating internal electrode layer 35A, the second floating internal electrode layer 35B and a third floating internal electrode layer 35C. Thus, by providing the floating internal electrode layer 35 as the internal electrode layer 30, the multilayer ceramic capacitor 1 includes a structure in which the counter electrode portion is divided into a plurality of counter electrode portions. With such a configuration, a plurality of capacitor components are provided between the opposing internal electrode layers 30, thus providing a configuration in which these capacitor components are connected in series. Therefore, the voltage applied to the respective capacitor components becomes low, and thus, it is possible to achieve a high breakdown voltage of the multilayer ceramic capacitor 1. It should be noted that, needless to say, the multilayer ceramic capacitor 1 of the present preferred embodiment may be a multiple-portion structure including four or more portions.

It should be noted that the multilayer ceramic capacitor 1 may be a two-terminal capacitor including two external electrodes, or may be a multi-terminal capacitor including a large number of external electrodes.

According to multilayer ceramic capacitors according to preferred embodiments of the present invention, the following advantageous effects are achieved.

(1) A multilayer ceramic capacitor 1 according to a preferred embodiment includes the multilayer body 10 including the plurality of dielectric layers 20 which are stacked and the plurality of internal electrode layers 30 which are stacked, and the external electrodes 40, each connected to the internal electrode layers 30, in which the external electrodes 40 each include the conductive resin layer 60 and the plated layer 70 provided on the conductive resin layer 60, the conductive resin layer 60 includes the resin portion 61, the conductive fillers 62 dispersed in the resin portion 61, and the metal particles 63 which are dispersed unevenly in a distribution differing from that of the conductive fillers 62 in the conductive resin layer 60, and an abundance ratio of the metal particles 63 to the resin portion 61 is higher on a side of the plated layer 70 of the conductive resin layer 60 than on a side of the conductive resin layer 60 close to the multilayer body 10.

With such a configuration, it is possible to decrease ESR by increasing the electrical contact in the conductive resin layer 60, and the electrical contact between the conductive resin layer 60 and the plated layer 70. Furthermore, since the multilayer ceramic capacitor 1 includes the metal particles 63 dispersed unevenly to the side of the conductive resin layer 60 close to the plated layer 70, the occurrence of plating defects is reduced or prevented, and the occurrence of solder burst defects accompanying the plating defects is also suppressed.

(2) In a multilayer ceramic capacitor according to a preferred embodiment of the present invention, an abundance ratio of the conductive fillers 62 to the resin portion 61 is equal or substantially equal on the side of the plated layer 70 of the conductive resin layer 60 and on the side of the conductive resin layer 60 close to the multilayer body 10.

Even when the conductive fillers 62 are uniformly dispersed in the conductive resin layer 60, since the conductive resin layer 60 includes the metal particles 63 in a distribution differing from the conductive fillers 62, the above-described advantageous effect can be obtained.

(3) In a multilayer ceramic capacitor according to a preferred embodiment of the present invention, an abundance ratio of the metal particles 63 to the conductive fillers 62 is higher on the side the plated layer 70 of the conductive resin layer 60 than on the side of the conductive resin layer 60 adjacent to the multilayer body 10.

For example, even when the conductive fillers 62 in the conductive resin layer 60 are small, the abundance ratio of the metal particles 63 to the conductive fillers 62 is increased on the side of the conductive resin layer 60 adjacent to the plated layer. Therefore, due to the presence of both the conductive fillers 62 and the metal particles 63, the occurrence of plating defects is reduced or prevented.

(4) The metal particles 63 of the multilayer ceramic capacitor 1 include metal primary particles 63A and metal secondary particles 63B including the metal primary particles 63A, and an average particle size of the metal primary particles 63A is about one tenth or less of an average particle size of the conductive fillers 62.

Since the metal particles 63 are sufficiently smaller than the conductive fillers 62, the metal particles 63 are likely to enter between the plurality of conductive fillers 62. Thus, the metal particles 63 effectively provide an energization path between the plurality of conductive fillers 62. As a result, ESR can be decreased.

(5) The average particle size of the conductive fillers 62 of the multilayer ceramic capacitor 1 is about 1 μm or more, for example.

Even when the conductive fillers 62 each having an average particle size of about 1 μm or more are used, the metal particles 63 are likely to enter between the plurality of conductive fillers 62 by using the metal particles 63 sufficiently smaller than the conductive fillers 62. Therefore, the metal particles 63 can easily provide an energization path between the plurality of conductive fillers 62. As a result, ESR can be decreased.

(6) The average particle size of the metal primary particles 63A of the multilayer ceramic capacitor 1 according to is about 0.1 μm or less, for example.

Since the metal particles 63 include the metal primary particles 63A having an average particle size of about 0.1 μm or less, the metal particles 63 are likely to enter between the plurality of conductive fillers 62. Therefore, the metal particles 63 can easily provide an energization path between the plurality of conductive fillers 62. As a result, ESR can be decreased.

(7) In the resin portion 61, the metal particles 63 of the multilayer ceramic capacitor 1 are provided between the conductive fillers 62 to provide an energization path between the conductive fillers 62.

The metal particles 63 are provided between the conductive fillers 62 to provide an energization path between the conductive fillers 62, thus achieving a decrease of ESR.

(8) Ionization tendency of the metal particles 63 of the multilayer ceramic capacitor 1 is lower than ionization tendency of the conductive fillers 62.

Since metal having a low ionization tendency is likely to be reduced after being impregnated in a state of an organometallic complex or metal ion, it is likely to be precipitated as metal. Therefore, even in consideration of the relationship with the ionization tendency of the conductive fillers 62, the metal particles 63 are likely to be precipitated as metal and provide an energization path having good electric conductivity.

(9) The conductive resin layer 60 of the multilayer ceramic capacitor 1 includes an organometallic complex or metal ion.

As long as it is possible to achieve a decrease of ESR, it is acceptable for a fixed amount of an organometallic complex or metal ion to remain. For example, a method in which a solvent prepared by dissolving an organometallic complex or metal ion, which is to be converted to the metal particles 63, is brought into contact with the resin portion 61 to impregnate the resin portion 61 with the organometallic complex or the metal ion can be adopted to form a favorable conductive resin layer 60 of the present preferred embodiment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
a multilayer body including a plurality of dielectric layers which are stacked and a plurality of internal electrode layers which are stacked; and
external electrodes, each connected to the plurality of internal electrode layers; wherein
the external electrodes each include a conductive resin layer and a plated layer on the conductive resin layer;
each conductive resin layer is a single layer;
the conductive resin layer includes a resin portion, conductive fillers dispersed in the resin portion, and metal particles dispersed unevenly in a distribution differing from that of the conductive fillers in the conductive resin layer; and
an abundance ratio of the metal particles to the resin portion is higher on a side of the plated layer of the conductive resin layer than on a side of the conductive resin layer adjacent to the multilayer body.

2. The multilayer ceramic capacitor according to claim 1, wherein an abundance ratio of the conductive fillers to the resin portion is equal or substantially equal on the side of the plated layer of the conductive resin layer and on the side of the conductive resin layer adjacent to the multilayer body.

3. The multilayer ceramic capacitor according to claim 2, wherein an abundance ratio of the metal particles to the conductive fillers is higher on the side the plated layer of the conductive resin layer than on the side of the conductive resin layer adjacent to the multilayer body.

4. The multilayer ceramic capacitor according to claim 1, wherein
the metal particles include metal primary particles and metal secondary particles including the metal primary particles; and an average particle size of the metal primary particles is about one tenth or less of an average particle size of the conductive fillers.

5. The multilayer ceramic capacitor according to claim 4, wherein the average particle size of the conductive fillers is about 1 μm or more.

6. The multilayer ceramic capacitor according to claim 4, wherein the average particle size of the metal primary particles is about 0.1 μm or less.

7. The multilayer ceramic capacitor according to claim 1, wherein, in the resin portion, the metal particles are between the conductive fillers to provide an energization path between the conductive fillers.

8. The multilayer ceramic capacitor according to claim 1, wherein an ionization tendency of the metal particles is lower than an ionization tendency of the conductive fillers.

9. The multilayer ceramic capacitor according to claim 1, wherein the conductive resin layer includes an organometallic complex or metal ion.

10. The multilayer ceramic capacitor according to claim 1, wherein each of the plurality of dielectric layers includes at least one of $BaTiO_3$, $CaTiO_3$, $SrTiO_3$, or $CaZrO_3$ as a main component.

11. The multilayer ceramic capacitor according to claim 10, wherein each of the plurality of dielectric layers includes at least one of a Mn compound, an Fe compound, a Cr compound, a Co compound, or a Ni compound as a subcomponent.

12. The multilayer ceramic capacitor according to claim 1, wherein a thickness of each of the plurality of dielectric layers is about 0.5 μm or more and about 10 μm or less.

13. The multilayer ceramic capacitor according to claim 1, wherein a total number of the plurality of dielectric layers is 15 or more and 700 or less.

14. The multilayer ceramic capacitor according to claim 1, wherein each of the plurality of internal electrode layers at least one of Ni, Cu, Ag, Pd, or Au, or an alloy including at least one of Ni, Cu, Ag, Pd, or Au.

15. The multilayer ceramic capacitor according to claim 1, wherein a thickness of each of the plurality of internal electrode layers is about 0.2 μm or more and about 2.0 μm or less.

16. The multilayer ceramic capacitor according to claim 1, wherein a total number of the plurality of internal electrode layers is 15 or more and 200 or less.

17. The multilayer ceramic capacitor according to claim 1, wherein the plated layer includes a lower plated layer on the conductive resin layer and an upper plated layer on the lower plated layer.

18. The multilayer ceramic capacitor according to claim 17, wherein the lower plated layer is a Ni-plated layer and the upper plated layer is a Sn-plated layer.

* * * * *